(12) United States Patent
Udall

(10) Patent No.: US 7,891,167 B2
(45) Date of Patent: Feb. 22, 2011

(54) GAS TURBINE ENGINE FLOW REVERSER

(75) Inventor: Kenneth F. Udall, Derby (GB)

(73) Assignee: Rolls-Royce plc, London (GB)

(*) Notice: Subject to any disclaimer, the term of this patent is extended or adjusted under 35 U.S.C. 154(b) by 951 days.

(21) Appl. No.: 11/798,748

(22) Filed: May 16, 2007

(65) Prior Publication Data
US 2008/0060342 A1 Mar. 13, 2008

(30) Foreign Application Priority Data
Jun. 16, 2006 (GB) ................................ 0611963.0

(51) Int. Cl.
*F02K 3/02* (2006.01)
(52) U.S. Cl. .............. 60/226.2; 244/110 B; 239/265.25
(58) Field of Classification Search ................ 60/226.2, 60/230; 244/110 B; 239/265.25, 265.29
See application file for complete search history.

(56) References Cited

U.S. PATENT DOCUMENTS 3,650,110 A * 3/1972 Ghougasian ................ 60/230
4,232,516 A 11/1980 Lewis et al.
6,474,059 B2 * 11/2002 Stretton ...................... 60/226.2
6,568,172 B2 * 5/2003 Jannetta et al. ............. 60/226.2
6,663,042 B2 * 12/2003 Hatrick et al. ........... 244/110 B
7,334,395 B2 * 2/2008 Tweedie et al. ............. 60/226.2
7,484,356 B1 * 2/2009 Lair ........................... 60/226.2
7,673,442 B2 * 3/2010 Seda et al. .................. 60/226.2

FOREIGN PATENT DOCUMENTS

EP 1 416 147 A1 5/2004
EP 1 515 035 A2 3/2005

* cited by examiner

*Primary Examiner*—William H Rodríguez
(74) *Attorney, Agent, or Firm*—Oliff & Berridge, PLC

(57) ABSTRACT

A flow reverser comprising a sleeve having a first part and a second part to define a flow path and axially separable from each other about a conjunction formed by a respective profile edges for the first part and the second part, the profile edges in a stowed position overlapping, the reverser characterised in that in a deployed position a nozzle part of each profile edge define together a nozzle jet and a reverser part of one edge profile is adjacent to a core to provide an effective flow deflector.

30 Claims, 5 Drawing Sheets

GAS TURBINE ENGINE FLOW REVERSER

BACKGROUND OF THE INVENTION

1. Field of the Invention

The present invention relates to thrust or flow reversers utilised in such situations as gas turbine engines or where control of a primary and secondary flow is required.

2. Description of Related Art

Thrust reversers in a gas turbine engine provide three functions, namely, to provide a contiguous external aero-dynamic surface for the engine nacelle, to provide a flow path for the engine in forward thrust mode and to reverse the exhaust flow in the engine to assist typically aircraft deceleration. It is known to provide thrust reversers which utilise blocker doors which extend into the flow path in order to reverse the flow direction in the exhaust flow reversal mode described above. It is also known to provide blocker less door designs in which axial translation of the aft part of the nacelle brings the front outer annulus into sealing engagement with the inner annulus hump which opens up a radial gap for the outflow of fan air for reverse thrust. Cascades are provided to form a nozzle and to direct the air axially and circumferentially. These cascades interleave between the inner and outer aft nacelle skins in the stowed position so that the load-path connecting the skins has to wrap around the cascades, hence the load-path is long and flexible.

BRIEF SUMMARY OF THE INVENTION

In accordance with aspects of the present invention there is provided a gas turbine engine incorporating a flow reverser, the flow reverser comprising a first part and a translatable second part to define a flow path and axially separable from each other about a conjunction formed by respective profile edges of the first part and the second part, the profile edges in a stowed position overlapping, wherein in a deployed position a nozzle part of each profile edge define together a nozzle jet characterised in that the nozzle jet has a width that varies around at least a part of the circumference of the engine.

Typically, the profile edges in the stowed position provide a substantially contiguous surface across the conjunction opposite the core.

Typically, the conjunction includes a bull nose part in one edge profile and a hook part in the other edge profile.

Advantageously the reverser part engages the core to form a seal.

Possibly, the reverser part engages a hump part of the core.

Possibly, the nozzle parts converge to form the nozzle jet. Normally the nozzle parts converge to an opening at an outer side of the sleeve.

Potentially, the nozzle parts are arranged to substantially face each other.

Typically, the nozzle parts are reciprocally curved in an axis of separation between the first part and the second part.

Possibly, the reverser part and/or the core include seal elements. Typically, the seal elements include an inflatable part or flap or iris-type mechanism to close any gap between the reverser part and the core.

Possibly, the overlapping profile edges have a respective inter-engagement surface. Possibly, the inter-engagement surfaces have a variable width along the conjunction between the first part and the second part. Possibly, the profile edges define a half-moon nozzle jet in the deployed position. Normally, there are two half-moon nozzle jets either side of the flow reverser. Generally, top dead centre and bottom dead centre parts of the conjunction have the minimum or no gap between the first part and the second part in the deployed position.

Typically, the nozzle parts have rounded edges. Advantageously, one nozzle part is slightly outboard of the other nozzle part.

Generally, the sleeve can be cylindrical or oval or any cross-section appropriate in order to provide a nozzle jet by axial separation of a first part and a second part through profile edges.

Generally, in the stowed position outer parts of the edge profiles form a contiguous surface for the sleeve.

Generally, the edge profiles have a variable angle about the sleeve in order to create appropriate presentation of the nozzle jet in the deployed position. Possibly, the nozzle jets created in the flow reverser are symmetrical. Alternatively, the nozzle jets are not symmetrical about the sleeve.

Generally, the flow reverser is a thrust reverser in a gas turbine engine.

Possibly, the nozzle jets have a circumferential flow component.

Also in accordance with the present invention is a gas turbine engine including a flow reverser as a thrust reverser.

Preferably, the width of the nozzle jet is a minimum within 30 degrees of the bottom dead centre of the engine.

Preferably, the width of the nozzle jet (30) is a minimum within 30 degrees of the top dead centre of the engine.

Alternatively, the engine is attached to a pylon, the width of the nozzle jet is a minimum within 30 degrees of the pylon.

BRIEF DESCRIPTION OF THE DRAWINGS

An embodiment depicting aspects of the present invention will now be described by way of example only with reference to the accompanying drawings in which.

DETAILED DESCRIPTION OF THE INVENTION

Figure 1:
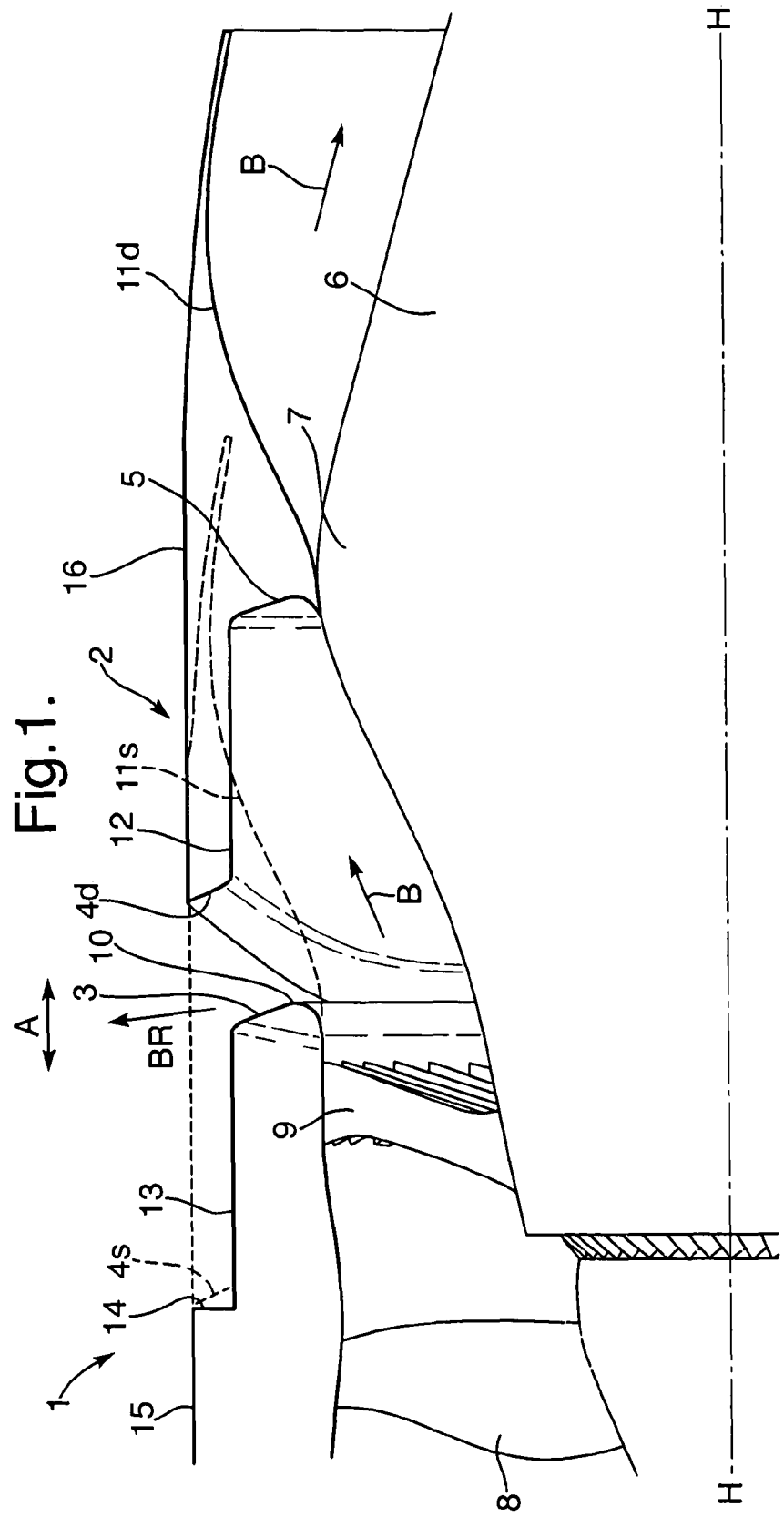
FIG. 1 is a schematic illustration of a flow reverser in accordance with aspects of the present invention as a top half cross-section through a horizontal centreline H-H and shown in the deployed position.

FIG. 1 provides a schematic top half cross-section along a horizontal centreline H-H of a flow or thrust reverser in accordance with aspects of the present invention. The flow reverser is illustrated in FIG. 1 in its deployed position, that is to say with axial separation between a first part 1 and a second part 2. In this deployed position a nozzle jet is created between surface parts 3, 4 of the respective parts 1, 2. Thus, the angle of the thrust reverse direction duct is determined by the nozzle jet formed between the surfaces 3, 4. It will be understood that the particular angles and other configurations of the surfaces 3, 4 are determined by operational performance requirements but generally will converge towards an opening at an outer peripheral part of the reverser. Furthermore, there will be a local gap and angle arranged so that the surfaces 3, 4 face each other to define the appropriate nozzle jet between the surfaces 3, 4. In order to maintain the local gap and angle between the surfaces 3, 4 it will be understood that these angles and relative axial positions will vary around the periphery of the reverser from the horizontal centreline H-H to maintain the appropriate presentation of the surfaces 3, 4 whilst varying outward flow angle and local nozzle area for flow and thrust reverse performance.

It will be understood that the reverser is moved from the stowed position to the deployed position depicted in FIG. 1 through effective axial separation of a conjunction of profile edges formed in the respective parts 1, 2. These profile edges incorporate the nozzle surface parts 3, 4. In such circumstances, deployment will be through the axial movement in the direction of arrowheads A. In the preferred embodiment depicted in FIG. 1 it will therefore be understood that there is an effective large translation of an aft nacelle incorporating part 2 from a forward stowed position to an aft deployed position shown in FIG. 1. In the deployed position a reverser part 5 acts against a flow path core 6 and in particular a hump section 7 of that core. In the embodiment depicted it will be appreciated that a gas turbine engine is depicted and therefore the core 6 comprises the engine core. In such circumstances a reverse thrust flow BR from fan blades 8 and outlet guide vanes, 9 exits through the nozzle jet formed between the surfaces 3, 4.

In the stowed position the reverser part 5 seals against a bull nose part 10 of the edge profile defined in the first part 1. In such circumstances it will be appreciated that at least a hook section of the reverser part 5 and the bull nose part 10 are axi-symmetric in order to create a substantially contiguous surface for normal operation. It will be understood that the fan blades 8 and guide vanes 9 generate a thrust flow which passes in the direction of arrowheads B. In the deployed position depicted in FIG. 1 this flow B exits as the reverse flow BR. In the stowed position, that is to say with the profile edge of part 2 overlapping the profile edge of part 1 with the reverser or deflector part 5 engaging the bull nose 10 as indicated a substantially contiguous surface is created illustrated by broken line 11s and so the flow B will then pass along the flow path created between that contiguous surface 11s and the core 6 in a forward thrust mode. In the deployed position it will be noted the surface is axially displaced to a position shown as 11d.

It will be noted that in the stowed position (shown in broken line), that inter-engagement surfaces 12, 13 are provided in each profile edge when the profile edges overlap in normal forward thrust situations when the flow reverser is in the stowed position. In such circumstances a front edge part 4s substantially provided by the nozzle part 4 in such circumstances approaches an edge 14 to create an external aerodynamic profile for a nacelle incorporating the flow reverser, that is to say, the outer surfaces 15, 16 are substantially contiguous over the conjunction of the profile edges.

The situation depicted in FIG. 1 assumes it is possible to provide sufficient radial outward projection by the hump 7 or inward projection by the reverser/deflector part 5 to create a reversing flow or that there is sufficient length to allow the axial separation to define the nozzle jet between the surfaces 3, 4. In such circumstances where it is difficult to provide sufficient radial projection it will be understood that either the reverser or deflector part 5 or the hump 7 may be provided with blocker doors, that is to say upstanding flaps with actuators or an inflatable seal or a camera iris-type arrangement to control the gap between the reverser/deflector part 5 and the hump 7. It will be understood that such arrangements may also allow a higher efficiency seal to be created than simply bringing the deflector part 5 and hump 7 into close association.

A further alternative where translational length is limited or where fan flow area control balance is necessary is to allow some flow to continue through the forward thrust flow path with a gap left between the reverser/deflector part 5 and the hump 7 of the core 6. This reduced gap throttles the axial forward flow proportion of flow B so that this flow overexpands through the forward thrust nozzle jet so that again the axial flow residual forward thrust B is low and the reverse thrust BR dominates.

It will be understood that there is a general need for a local small nozzle jet gap between the surfaces 3, 4 with generally a large off-set between the forward surface 3 and the reverser/deflector part 5. These conflicting requirements are achieved through use of a variable length with regard to the overlapping surfaces 12, 13 separating the aft surface 4 of the nozzle jet and the reverser/deflector part 5. As can be seen, the edge profile with nozzle surface 4 generally is not flat and has a curvature as described later.

It will be understood that the reverser arrangement in accordance with aspects of the present invention essentially comprises a sleeve having parts 1, 2 normally held together in a stowed position with a preferably contiguous surface 11 for a flow path between that surface 11 and the core 6. In such circumstances the parts 1, 2 are generally cylindrical and in order to maximise the air guide flow length in the nozzle jet formed between the surfaces 3, 4 it will be understood that in the stowed position the part 2 in the form of a cylinder 12 is only just outboard of a similar cylinder 13 formed in the part 1. The profile edges are generally rounded to aid air flow, create structural smoothness and assist with regard to scissoring engagement of one part sliding over the other when moving to the stowed position. As will be described later typically the profile edges will be symmetrical creating half-moon apertures either side of top dead centre (TDC) and bottom dead centre (BDC) with the parts 1, 2 never completely disengaging, that is to say separating from each other at these TDC and btc positions. As described previously, when in the stowed position the radial abutment of the parts 1, 2 overlapping each other ensure radial alignment of the outer nacelle surfaces 15, 16 to give a smooth external flow line.

For the avoidance of doubt although generally a cylindrical shape for the surfaces 12 and 13 is appropriate, it will be understood that the sleeve formed by the parts 1, 2 may also take other axially viewed profiles including oval or even re-entrant interlocking profiles.

Although typically the surface 3 through its bull nose 10 will be symmetric with the surface incorporating the reverser or deflector part 5, other parts of the thrust or flow reverser can be conformal in order to create the desired external surface. It will be understood that the edge 14 generally follows the same profile, which will typically be curved, as the surface 4 in order to create a substantive seal relative to external flow. Underlying this close association between the surface 4 and forward edge 14 it will be appreciated that this edge 14 may closely be formed to the surface 4 or not dependent upon requirements. Although it is necessary to accurately provide profiling of the surfaces 3, 4 in order to achieve a desired nozzle jet form, it will be understood that the edge 14 as well as the reverser/deflector part 5 can take a simpler form providing significant benefits with regard to cost and weight reduction. By simpler form what is meant is that these parts 5, 14 can be shaped to reasonable conformity with their opposed parts, respectively surface 3 and bull nose 10 along with nozzle surface 4. If the surfaces are not accurately conformed as shown they need to avoid interference when stowing, that is to say maintain a position gap except at the sealing parts.

Figure 2:
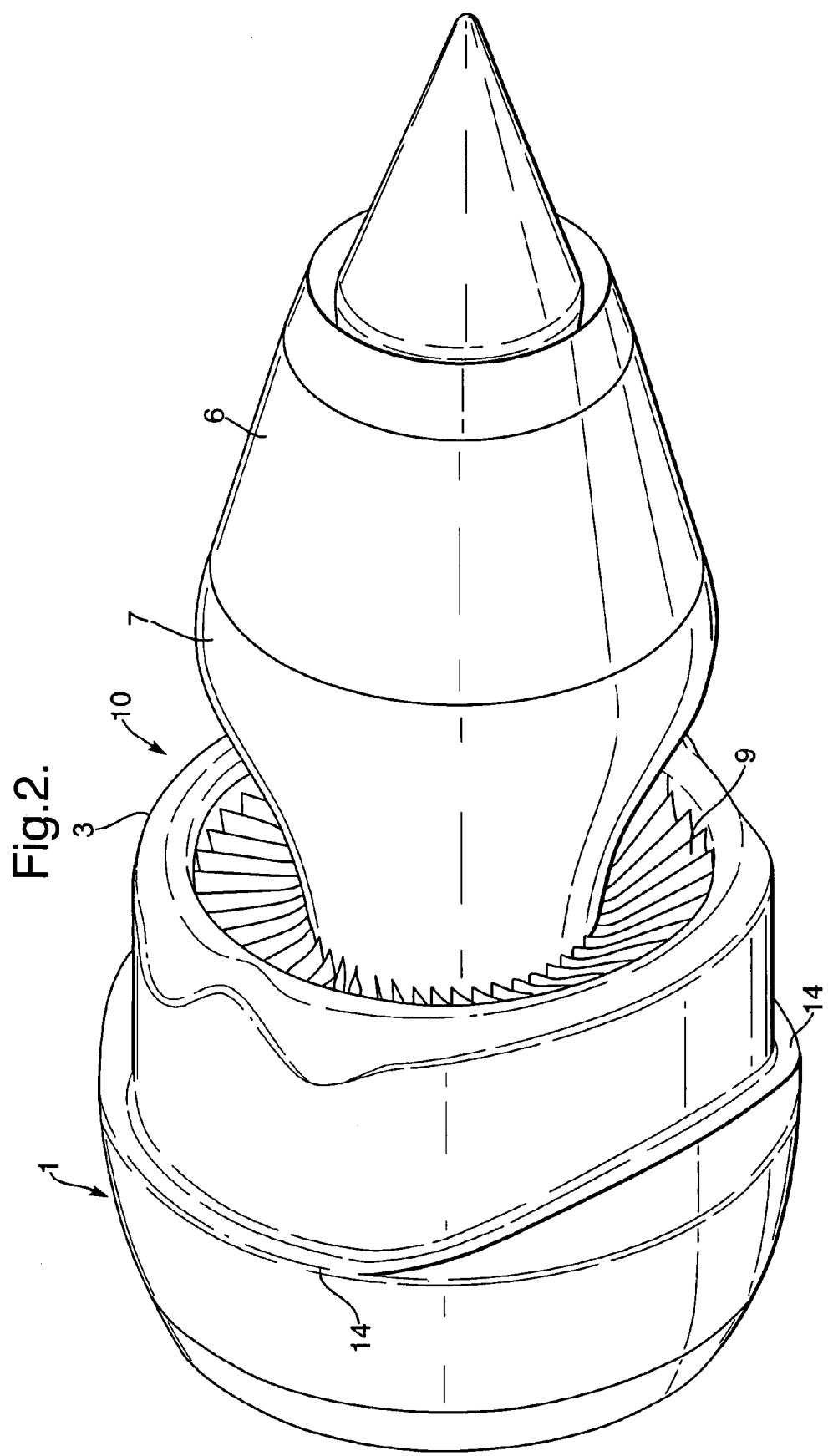
FIG. 2 is a schematic rear perspective view illustrating a core part of the flow reverser.

FIG. 2 provides a schematic rear perspective view illustrating the first part 1 associated with an engine core 6 with the second part (FIG. 1) removed. It will be noted that the surface 3 varies in angle around its circumference starting within an angle of 40° to the radial at 90° from the top dead centre to a 50° angle at 60° from top dead centre and then follows a 10° of circumference rule until 20° from the top dead centre when it switches back to the side angle to bring the sleeve surface aft for a nozzle gap closure. This particular angular variation is not essential and will depend upon particular operational requirements but may be considered typical to an embodiment of the present invention. Its general form controls the axial and circumferential directions of the efflux jet. In particular, it will be understood that 20° from top dead centre relationship with regard to the surface 3 angle may be too severe and a more radial angle may be acceptable for a smoother blend to top dead centre.

Note should be taken with regard to the edge 14 which will marry with the other nozzle surface 4 (FIG. 1) in use. As can be seen, the edge 14 is curved to match similar shaping of the nozzle surface 4 and in particular its profile edge for a consistency of surface 16 with the outer surface 15.

Figure 3:
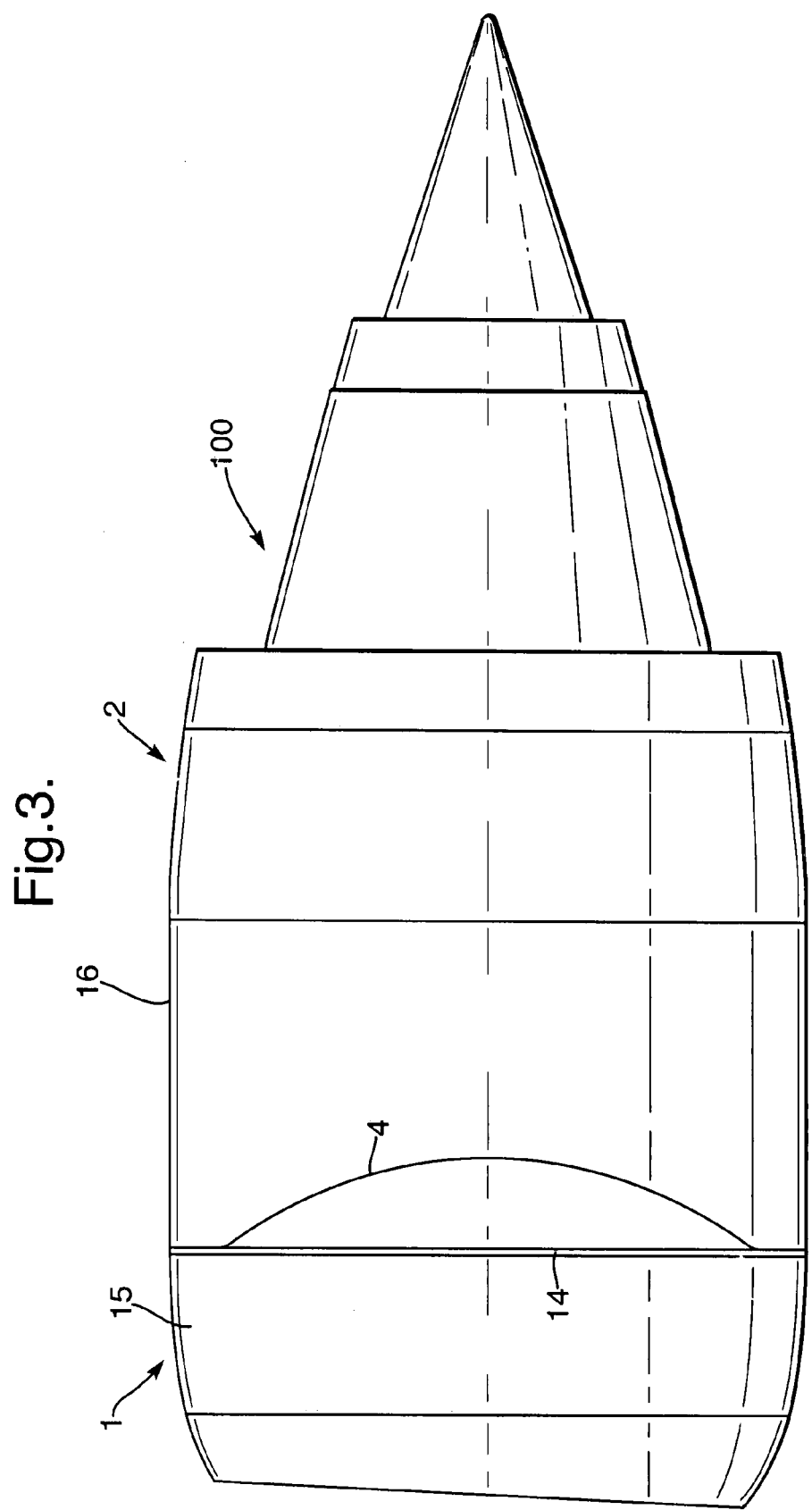
FIG. 3 is a schematic side view of a gas turbine engine incorporating a flow reverser in accordance with aspects of the present invention in a stowed position.

FIG. 3 illustrates a side view of a gas turbine engine incorporating a thrust or flow reverser in accordance with aspects of the present invention in a stowed position. As can be seen, the parts 1, 2 are held in a juxtaposed position with the edge profiles overlapping so that nozzle surface 4 is associated with edge 14 and a substantially contiguous external surface is created between parts 1, 2 over surfaces 15, 16. In such circumstances the aero-dynamic profile of an engine 100 incorporating a thrust reverser in its normal stowed position is not compromised. It will be understood that within the overlapping parts 1, 2 the deflector or reverser part 5 (FIG. 1) has engaged the nozzle surface 3 (FIG. 1) and therefore a substantially contiguous surface 11 (FIG. 1) has been formed to enable normal forward thrust operation of the engine 100.

Figure 4:
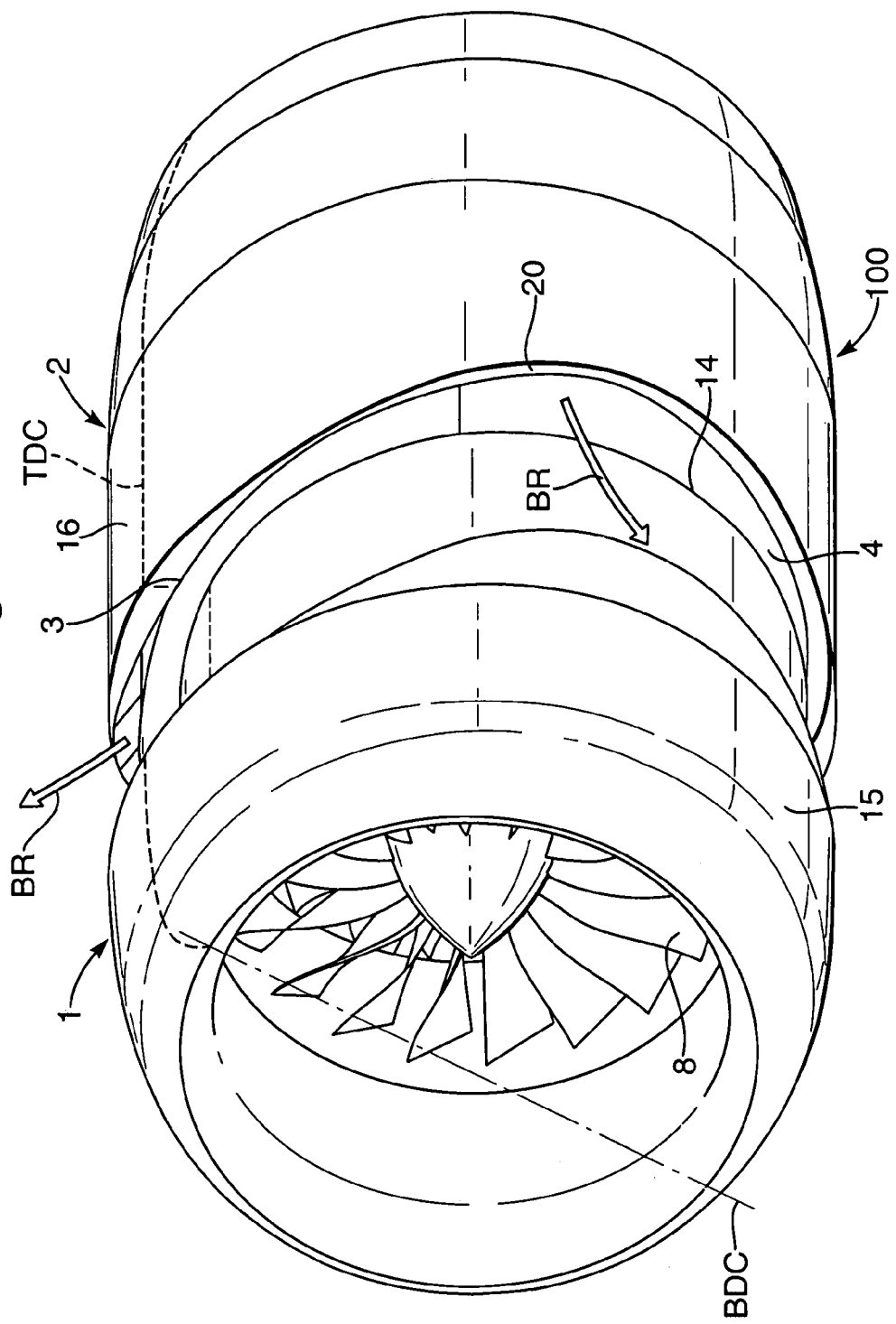
FIG. 4 is a schematic front perspective view of a gas turbine engine incorporating a flow reverser in accordance with aspects of the present invention in a deployed position; and, FIG. 5 is a schematic cross section of an engine with a reverser in a deployed position.

FIG. 4 shows a schematic front perspective view of the engine 100 depicted in FIG. 3 in its deployed position. It will be noted that a nozzle jet is defined between surfaces 3, 4 but at a top dead centre, and at a bottom dead centre although not shown, there is closing off of the nozzle jet so that the reverser in terms of the reversed flow BR avoids direct infringement at TDC with a mounting pylon or slat for the engine 100 and also ground impingement at BDC. It will also be noted that as the overlapping sections of the parts 1, 2 in terms of the edge profiles are curved to give a scissoring effect initiated at TDC and BDC, that is to say gradual expansion and gradual pinching of the nozzle jet between the surfaces 3, 4 during movement between the stowed position and the deployed position. It will also be understood that by appropriate choice of the angling of the angular nozzle surfaces 3, 4 and particularly a reduced angle at 20% from either side of TDC and BDC also minimises the radial component of the reverse thrust BR to again minimise slat and ground impingement by that flow BR. Finally, it will be understood by appropriate choice of angling and gaps between the surfaces 3, 4 specific control of the reversed thrust BR can be achieved and so present more desirable axial loads more evenly round the circumference of the engine 100.

By appropriate choice of angles and gaps the reverser will have a nozzle jet area near to 90° from TDC, that is to say in mid-point locations which are greater than that at near to TDC and BDC. In such circumstances the maximum nozzle jet area will typically be around portion 20 in FIG. 4 and will symmetrically decrease back to lower nozzle areas nearer to the TDC and BDC. This arrangement as indicated may be symmetrical but the edge profiling in terms of creating the nozzle jet area need not be symmetrical from top to bottom or side to side if there is a benefit from such asymmetry in terms of greater reverse thrust performance. It will be appreciated that the embodiment described above generally has two lobes, that is to say half-moon type nozzle jets either side of TDC and BDC but where desirable by appropriate choice of nozzle surface 3, 4 shaping it will be understood that a single substantially circumferential symmetrical nozzle jet could form a single lobe or more lobes could be provided about the circumference of the engine 100. In such circumstances the nozzle jet area and distribution about the circumference may be tailored to requirements.

It will be appreciated by appropriate shaping of the nozzle surfaces 3, 4 that the reverse thrust flow BR can be arranged to migrate away from TDC and BDC to the more open nozzle positions towards the lateral horizontal portion 20. Such an arrangement should allow more efficient use of reverse thrust flow BR whilst avoiding slats and ground impingement problems.

Figure 5:
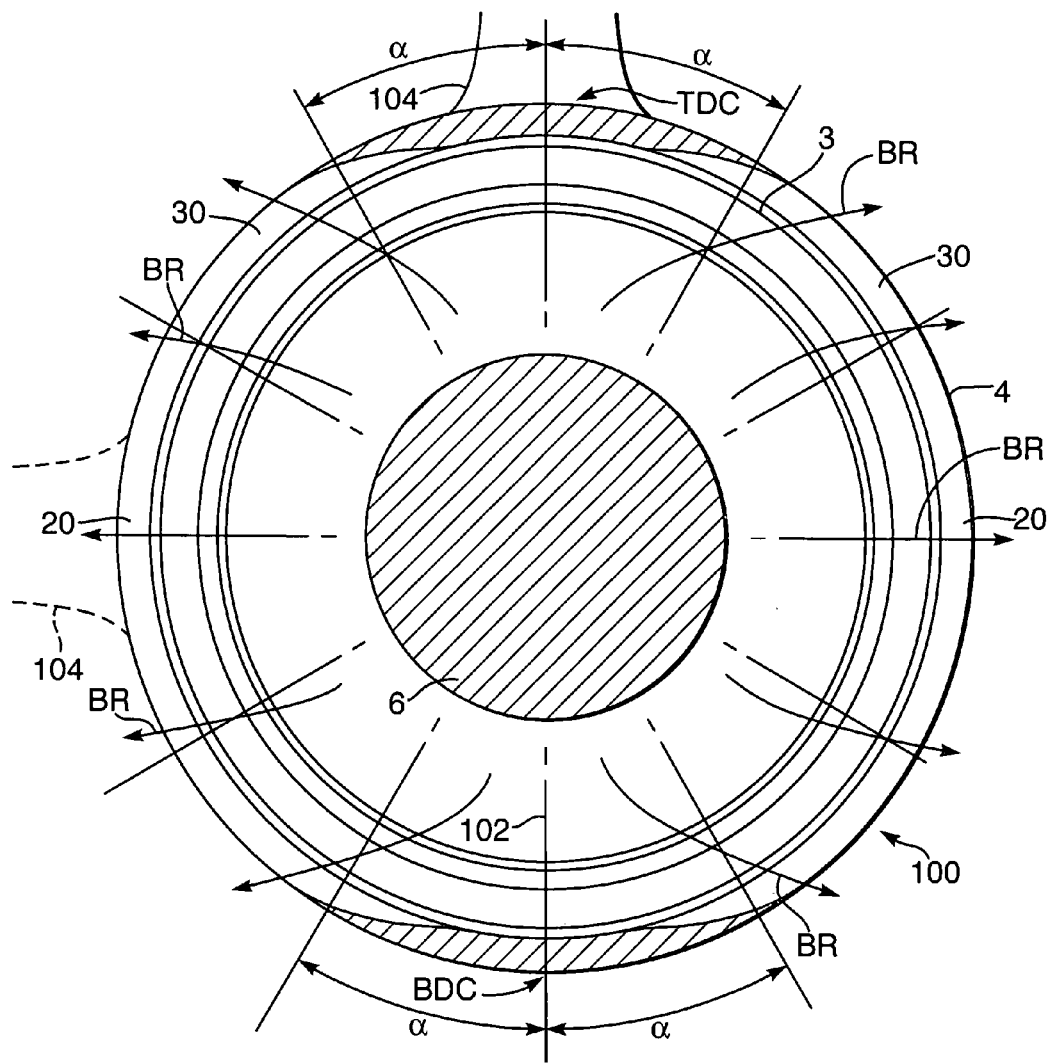

FIG. 5 shows a schematic cross section of a flow or thrust reverser in accordance with aspects of the present invention and in particular with regard to circumferential variation in the nozzle jet aperture provided in the references. Similar deployed position to previous Figs. has been used for comparison. Thus, an opening or nozzle jet 30 is provided between nozzle surfaces 3, 4. It will be noted in use a reverse flow or thrust BR passes through the jet nozzle 30.

It will be noted at top dead centre TDC and bottom dead centre the nozzle jet 30 or opening closes or is blocked such that bypass air for the reverse flow or thrust BR is preferentially expelled out of the wider mid potions 20 of the nozzle jet 30. Generally, at the top dead centre a pylon or nacelle hinge or mounting structures for an engine 100 are provided such that it will be undesirable to provide reverse flow or thrust in this area. At bottom dead centre (BDC) it is undesirable to eject air as such reverse flow or thrust will generally disturb runway debris potentially leading to ingestion by the fan blades. Nevertheless, the bypass air at the top dead centre and bottom dead centre has a circumferential velocity component diverted towards the openings of the nozzle jet 30. This circumferential velocity component may be utilised in order to provide reverse thrust or flow particularly tuned to desired situations. As indicated above, a two lobe format as depicted in FIG. 5 has substantially half moon type nozzle jets 30 but it will be appreciated where desired and in particular in order to create more circumferential velocity components in the reverse flow or thrust, additional lobes can be provided which are either balanced and circumferentially distributed across the engine 100 or not. It will also be understood that the lobe distribution in a multi engine aircraft may provide reverse thrust in a controllable manner by aggregate or the reverse thrust from each engine combined to provide a net result.

Modifications and alterations to the present invention will be appreciated by those skilled in the art. Thus, the flow reverser could be utilised in other situations where reversing direction of a flow such as a ventilation flow is required.

In summary the present invention is a gas turbine engine 10 incorporating a flow reverser comprising a fixed first part 1 and a translatable second part 2. The translatable part 2 is moveable in a general axially rearwardly direction, although alternatively the first part may be translatable forwardly with respect to the general flow direction through the engine. The first part 1 and the translatable second part 2 define a bypass air-flow path and are axially separable from each other about a conjunction formed by respective profile edges of the first part and the second part. When the flow reverser is in a stowed position the profile edges overlap one another and there is no reverse flow. In the deployed position, where the first part 1 and the translatable second part 2 are axially spaced, a nozzle part 3, 4 of each profile edge define together a nozzle jet 30 that has a width that varies around at least a part of the circumference of the engine. Thus the reverse flow may be preferentially ejected away from certain regions of the circumference, particularly near a pylon 104, 104' (see FIG. 5) and/or the ground immediately under the engine. Avoiding a significant flow or having a zero flow immediately adjacent the ground prevents runway debris being flung up by the efflux and ingested into the engine.

In particular, the width of the nozzle jet 30 is a minimum, including zero, within an angle $\alpha=30$ degrees either side of the bottom dead centre or top dead centre or of the engine or the pylon 104, 104'. Therefore more or all the exhaust flow is ejected around the sides of the engine.

Preferably, and as shown in the figures the nozzle jet has smooth curves defined by the edges, which increase the width to a maximum at least 30 degrees away from the minimum width position. Alternatively, a rectilinear step change is possible, having no smooth transitional width between the minimum and maximum widths.

The width of the nozzle jet 30 is preferably symmetrical about a vertical centre-line 102 (see FIG. 5) of the engine, thus both the port and starboard engine's reversers may be the same configuration.

It should be appreciated that a fuselage mounted engine is supported from a pylon 104' attached on a lateral side thereof. In cases where a fuselage mounted engine is sufficiently high above ground, then there may be some or full flow of exhaust gases at BDC. Hence only a minimum nozzle jet width is present near the pylon 104'.

I claim:

1. A flow reverser of a gas turbine engine, the flow reverser comprising a first part; and
    a translatable second part to define a flow path and axially separable from each other about a conjunction formed by respective profile edges of the first part and the second part, the profile edges in a stowed position overlapping, wherein in a deployed position a nozzle part of each profile edge define together a nozzle jet, the nozzle jet having a width that varies around at least a part of the circumference of the engine.

2. A reverser as claimed in claim 1 wherein the profile edges in the stowed position provide a substantially contiguous surface across the conjunction opposite the core.

3. A reverser as claimed in claim 1 wherein the conjunction includes a bull nose part in one edge profile and a hook part in the other edge profile.

4. A reverser as claimed in claim 1 wherein the reverser part engages the core to form a seal.

5. A reverser as claimed in claim 1 wherein the reverser part engages a hump part of the core.

6. A reverser as claimed in claim 1 wherein the nozzle parts converge to form the nozzle jet.

7. A reverser as claimed in claim 6 wherein the nozzle parts converge to an opening at an outer side of a sleeve.

8. A reverser as claimed in claim 1 wherein the nozzle parts are arranged to substantially face each other.

9. A reverser as claimed in claim 1 wherein the nozzle parts are reciprocally curved in an axis of separation between the first part and the second part.

10. A reverser as claimed in claim 1 wherein the reverser part and/or the core include seal elements.

11. A reverser as claimed in claim 10 wherein the seal elements include an inflatable part or flap or iris-type mechanism to close or narrow any gap between the reverser part and the core.

12. A reverser as claimed in claim 1 wherein the overlapping profile edges have a respective inter-engagement surface.

13. A reverser as claimed in claim 12 wherein the inter-engagement surfaces have a variable width along the conjunction between the first part and the second part.

14. A reverser as claimed in claim 1 wherein the profile edges define a half-moon nozzle jet in the deployed position.

15. A reverser as claimed in claim 14 wherein there are two half-moon nozzle jets either side of the flow reverser.

16. A reverser as claimed in claim 1 wherein top dead centre and bottom dead centre parts of the conjunction have the minimum or no gap between the first part and the second part in the deployed position.

17. A reverser as claimed in claim 1 wherein the nozzle parts have rounded edges.

18. A reverser as claimed in claim 1 wherein one nozzle part is slightly outboard of the other nozzle part.

19. A reverser as claimed in claim 1 wherein a sleeve can be cylindrical or oval or any cross-section appropriate in order to provide a nozzle jet by axial separation of a first part and a second part through profile edges.

20. A reverser as claimed in claim 1 wherein in the stowed position outer parts of the edge profiles form a contiguous surface for a sleeve.

21. A reverser as claimed in claim 1 wherein the edge profiles have a variable angle about a sleeve in order to create appropriate presentation of the nozzle jet in the deployed position.

22. A reverser as claimed in claim 1 wherein the nozzle jets created in the flow reverser are symmetrical about a sleeve.

23. A reverser as claimed in claim 1 wherein the nozzle jets are not symmetrical about a sleeve.

24. A reverser as claimed in claim 1 wherein the nozzle jets have a circumferential flow component.

25. A reverser as claimed in claim 1 wherein the flow reverser is a thrust reverser in a gas turbine engine.

26. A flow reverser as claimed in claim 1 acting as a thrust reverser in a gas turbine engine.

27. A gas turbine engine as claimed in claim 1 wherein the width of the nozzle jet is a minimum within 30 degrees of the bottom dead centre of the engine.

28. A gas turbine engine as claimed in claim 1 wherein the width of the nozzle jet is a minimum within 30 degrees of the top dead centre of the engine.

29. A gas turbine engine as claimed in claim 1 wherein the engine is attached to a pylon, the width of the nozzle jet is a minimum within 30 degrees of the pylon.

30. A gas turbine engine as claimed in claim 1 wherein the nozzle jet has a lobed shape.

* * * * *